May 19, 1964  H. E. STEINBERG ETAL  3,133,307
MARKING INSTRUMENT
Filed Nov. 8, 1962
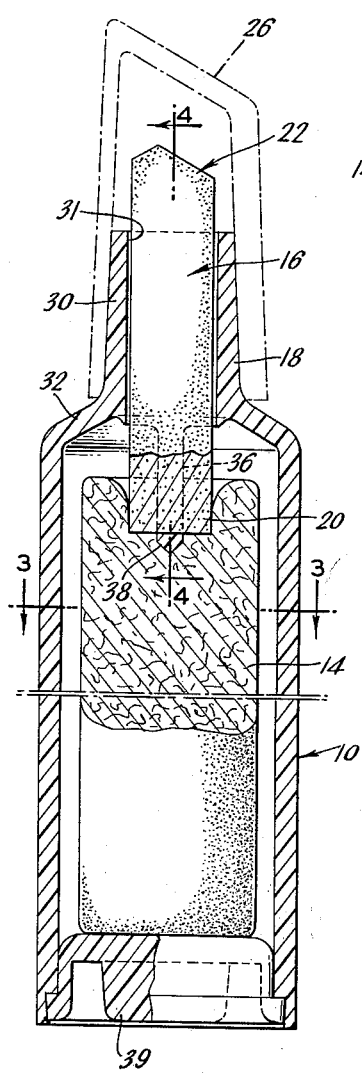
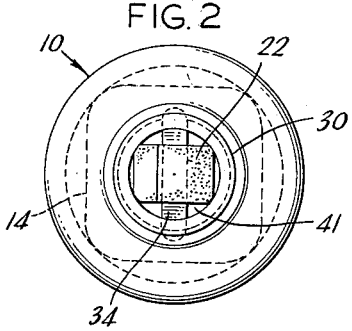
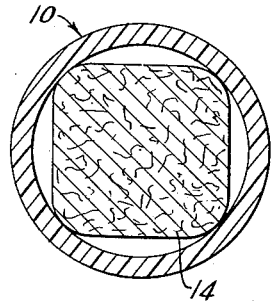
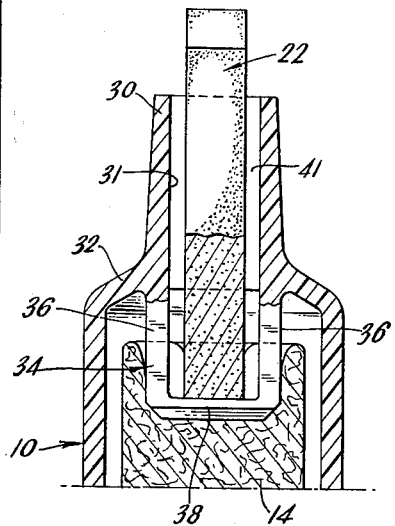
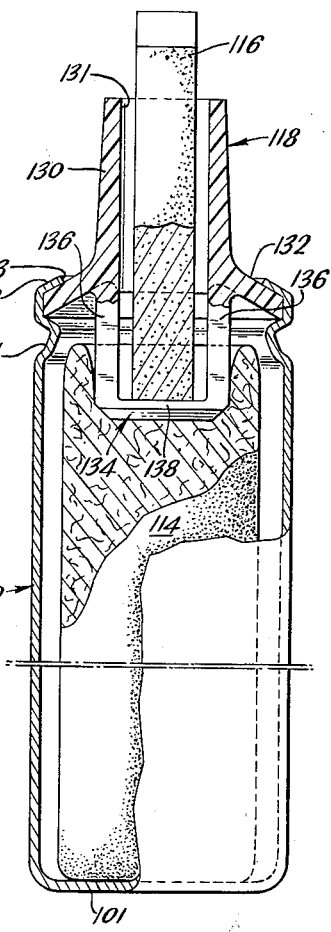
INVENTORS.
HAROLD E. STEINBERG
FRANK W. ROLLER, SR.
BY Howson & Howson
ATTYS.

United States Patent Office 3,133,307
Patented May 19, 1964

3,133,307
MARKING INSTRUMENT
Harold E. Steinberg, Philadelphia, Pa., and Frank W. Roller, Sr., Barrington, N.J., assignors to The Esterbrook Pen Company, Camden, N.J., a corporation of New Jersey
Filed Nov. 8, 1962, Ser. No. 236,288
7 Claims. (Cl. 15—563)

This invention relates to marking instruments of the type including an ink reservoir and a nib holder adapted to support a felt nib over one end of the reservoir in position to receive ink by capillary action from an ink carrier housed in the reservoir.

An object of the present invention is to provide a marking instrument of the felt type which is characterized by a novel arrangement of parts including a nib holder having a nib positioning member adapted to support the nib in a predetermined fixed position to withdraw ink from the ink carrier and to prevent inward displacement of the nib by writing pressure exerted on the nib or outward displacement due to expansion of the carrier.

Another object of the present invention is to provide a marking instrument including an improved type of nib holder wherein the nib is supported in place therein with a minimum of friction so that it may be interchanged readily when desired.

Still another object of the present invention is to provide a marking instrument which is comprised of comparatively few parts and is of a comparatively simplified construction, whereby the instrument may be manufactured economically.

These and other objects of the present invention and the features and details of a marking instrument made in accordance with the present invention are hereinafter more fully set forth with reference to the accompanying drawings, in which:

FIG. 1 is a longitudinal sectional view of a marking instrument in accordance with the present invention;

FIG. 2 is a plan view of the marking instrument shown in FIG. 1;

FIGS. 3 and 4 are sectional views taken on lines 3—3 and 4—4 respectively of FIG. 1; and FIG. 5 is a longitudinal sectional view of another embodiment of marking instrument in accordance with the present invention.

Referring now to the drawings and particularly to FIG. 1 thereof, the marking instrument comprises a generally cylindrical hollow ink reservoir 10, an ink carrier or filler 14 housed in the reservoir 10 and an elongated felt nib 16 of generally rectangular cross sectional shape mounted at the upper end of the reservoir 10 by means of a nib holder 18. The ink carrier 14 is made of a material, such as felt, capable of storing a large quantity of ink. The marking instrument may include a cap 26 shown in broken lines which frictionally engages the outer periphery of nib holder 18 to cover the nib 16 when the instrument is not in use and which is easily detached therefrom when desired.

In accordance with the present invention, the nib holder supports the nib so that its inner end 20 contacts the ink carrier to supply ink by capillary action to the outer marking tip 22 which projects beyond the nib holder and includes means preventing the nib from being pressed into the reservoir by writing pressure or from being displaced outwardly by expansion of the absorbent filler. To this end and with reference to the marking instrument illustrated in FIGS. 1-4 inclusive, the nib holder 18 includes a generally cylindrical elongated neck 30, an axial bore 31 in the neck 30 extending from end to end to support the nib therein and a conical wall 32 depending from the lower or inner axial end of the neck 30 connected along its outer peripheral edge to the upper axial end of the ink reservoir 10. A nib positioning member in the form of a generally U-shaped stirrup 34 depends from the nib holder interiorly thereof as shown, having leg portions 36 which are connected at their outer ends at diametrically opposed points to the juncture of the conical wall 32 and the inner axial end of the neck 30 and a saddle or cross piece 38 connecting the leg portions 36 which intersects the central axis of the bore 31 and is disposed perpendicularly thereto. The saddle 38 provides a fixed abutment upon which the inner end 20 of the nib seats. As illustrated in FIG. 1, the saddle 38 is of triangular cross section with the apex thereof facing downwardly. By this arrangement, an edge confronts the upper axial face of the reservoir filler 14 so that the saddle 38 may penetrate the reservoir filler 14 more readily without crushing it and provide a pocket therein for the inner end 20 of the nib to insure adequate surface contact between the nib 16 and filler 14 for proper ink transfer. In the present instance, the neck 30, conical wall 32 and stirrup 34 are of one-piece construction and are formed integrally with the ink reservoir 10 so that these parts of the marking instrument may be manufactured economically of a plastic material by means of a conventional molding process. In the present instance, the lower axial end of the reservoir 10 is open to facilitate insertion of the filler 14 in the reservoir 10, and a plug 39 is provided to close the bottom of the reservoir after insertion of the filler.

In assembling the marking instrument of the present invention for use, the ink carrier 14 is inserted into the ink reservoir 10 from the lower end thereof and the plug 39 is then positioned over the lower end and cemented or spin welded to the reservoir 10 to provide a leak-proof joint. The reservoir 10 is then filled with a quantity of ink which is inserted through the bore 31 of the neck 30. The nib 16 is then inserted into the bore of the neck with its inner end 20 abutting the saddle 38 of the stirrup 34. It is noted that the ink carrier 14 is of a predetermined length so that the saddle 38 and inner end 20 of the nib 16 are recessed in the filler 14 to provide for proper feeding of ink to the writing tip 22 of the nib by capillary action. Further it is noted that the side edges of the nib 16 frictionally engage the wall of the circular bore in the neck 30 permitting removal of the nib readily for replacement purposes and also providing air passages 41 between the nib 16 and nib holder 18.

The embodiment of marking instrument shown in FIG. 5 is basically the same in overall arrangement to that described above except that in the present instance, the nib holder is a separate member which is adapted to be secured in the open end of a conventional type ink reservoir 100. This reservoir, as shown, is hollow and of generally cylindrical form having an integral bottom wall 101 at its lower axial end and an opening 103 at its upper axial end to permit insertion of an ink filler 114 from the top of the reservoir.

The nib holder 118 as illustrated includes a generally cylindrical elongated neck 130, an axial bore 131 in the neck extending from end to end, a conical wall 132 depending from the lower or inner axial end of the neck 130 and a nib positioning member in the form of U-shaped stirrup 134 having leg portions 136 secured at their outer free ends to the juncture of the neck 130 and conical wall 132 and a saddle or cross piece 138 of triangular cross section connecting the outer ends of the leg portions.

In the present instance, the nib holder 118 is adapted to be secured in the open upper end of the reservoir to support the inner end of the nib in engagement with the ink filler 114. To this end, an annular inwardly projecting bead 154 is provided in the wall of the reservoir 100 spaced axially from the upper open end thereof which provides an abutment against which the outer peripheral edge of the conical wall 132 of the nib holder seats and the outer end of the reservoir is crimped or spun inwardly to provide an inwardly projecting lip 152 which snugly engages over the conical wall to provide a fluid-tight joint between the reservoir and nib holder.

In assembling the marking instrument illustrated in FIG. 5, the ink carrier 114 is placed in the reservoir 100 through the opening 103 at the upper end thereof and thereafter the nib holder 118 is assembled in place in the open end of the ink reservoir 100. In the present instance, this is accomplished by locating the nib holder so that the outer edge of the conical wall is disposed interiorly of the open end of the reservoir and then by means of a crimping tool forming the bead 154 and inwardly projecting lip 152 to secure the nib holder firmly in place and provide a fluid-tight joint. It is noted that the ink carrier 114 is of a predetermined length relative to the ink reservoir so that the triangularly shaped saddle 138 slightly depresses and engages in the top of the ink carrier. The nib 116 is then pressed into the bore of the neck 130 until the inner end thereof abuts the saddle 138.

From the foregoing it is apparent that the present invention provides an improved marking instrument of the nib type which is characterized by a novel arrangement of parts whereby the nib is positioned in the instrument in a manner preventing inward displacement by writing pressure thereby protecting the filler from being unduly compressed or crushed and also preventing outward displacement due to expansion of the filler which might affect ink transfer. Further it is also noted that a minimum frictional force is required to support the nib in a proper position so that it may be easily removed when necessary. Additionally the present invention provides a marking instrument of the nib type which is comprised of relatively few parts which may be manufactured economically, assembled easily and is extremely effective for the purposes intended.

While various embodiments of marking instrument in accordance with the present invention have been illustrated and described herein, it is not intended to limit the invention and changes and modifications may be made therein within the scope of the following claims.

We claim:

1. In a marking instrument including an ink reservoir and a filler for ink in said reservoir, a nib holder for mounting a nib at one end of the ink reservoir, said nib holder including an elongated neck provided with an axial bore therethrough communicating at its inner end with the ink reservoir, and a stirrup depending from the inner end of said neck, said stirrup having a portion extending at least partially across said bore providing an abutment for a nib mounted in the bore thereby to limit axial movement of the nib relative to the nib holder and engaging in one end of the filler to permit contact of the nib with the filler to draw ink therefrom by capillary action.

2. A marking instrument as claimed in claim 1 wherein said stirrup has leg portions connected at diametrically opposed points to the inner end of said neck and a saddle connecting the leg portions disposed interiorly of the ink reservoir and which is of triangular cross section with the apex thereof confronting and engaging in one end of the filler.

3. A marking instrument comprising an ink reservoir, a filler for ink in said reservoir, a nib holder at one end of said ink reservoir, said nib holder including an elongated neck provided with an axial bore therethrough communicating at one end with said ink reservoir, a nib positioning member extending crosswise of said bore engaging in one end of said filler and a nib mounted in said bore with its inner end abutting said nib positioning member and engaging said filler to draw ink therefrom by capillary action and its outer end projecting beyond the outer end of said neck.

4. A marking instrument as claimed in claim 3 wherein said nib positioning member comprises a generally U-shaped stirrup having a pair of axially extending leg portions depending from the inner end of said neck at diametrically opposed points and a saddle connecting the leg portions at their lower terminal ends which engages in one end of the filler.

5. A marking instrument comprising an ink reservoir open at one end, a filler for ink mounted in said reservoir, a cap detachably secured over the open end of said reservoir to close the open end of said ink reservoir and retain the filler therein, a nib holder at the end of said reservoir opposite said lower end, said nib holder including an elongated neck provided with an axial bore therethrough, a conical wall depending from the lower end of said neck connected at its outer peripheral edge to the ink reservoir, a generally U-shaped stirrup having leg portions depending axially from said nib holder at the juncture of said neck and conical wall and a saddle connecting the leg portions, said saddle disposed interiorly of the reservoir and engaging in one end of the filler, and a nib mounted in said bore with its inner end abutting said saddle and in engagement with said filler to draw ing therefrom by capillary action and its outer end projecting beyond the outer end of said neck.

6. A marking instrument as claimed in claim 5, wherein said leg portions are connected at diametrically opposed points adjacent the juncture of said conical wall in the lower end of said neck.

7. A marking instrument comprising an ink reservoir closed at its lower end and having an opening at its upper end, a filler for ink in said reservoir, a nib holder adapted to be secured adjacent the open end of said ink reservoir, said nib holder including an elongated neck provided with an axial bore therethrough, a nib positioning member extending at least partially across said bore adjacent the inner end of said neck, a nib frictionally engaged in said bore with its lower end abutting said nib positioning member and engaging said filler to draw ink therefrom, an annular wall adjacent the inner end of said neck, an outwardly projecting bead on the inner wall of said reservoir spaced axially from said one end thereof providing a seat for said annular wall and a radially inwardly projecting lip at said one end of the reservoir engaging over said annular wall to secure said nib holder to the reservoir and provide a fluid-tight joint therebetween.

References Cited in the file of this patent
UNITED STATES PATENTS

| | | |
|---|---|---|
| Re. 8,700 | Merrill | May 6, 1879 |
| 1,693,330 | Astley | Nov. 27, 1928 |
| 3,009,602 | Raehs | Nov. 21, 1961 |